United States Patent Office 2,782,208

Patented Feb. 19, 1957

2,782,208

CHLORINATED COBALT PHTHALOCYANINE PRECURSORS

Robert A. Brooks, Salem, N. J., assignor to E. I. du Pont de Nemours and Company, Wilmington, Del., a corporation of Delaware No Drawing. Application June 10, 1952, Serial No. 292,723

6 Claims. (Cl. 260—346.3)

This invention relates to novel organic compounds which may be designated as chlorinated cobalt phthalocyanine precursors.

It is an object of this invention to provide novel organic compounds which are useful for the production of chlorinated cobalt phthalocyanines in substance or on textile fiber. A further object is to produce novel organic compounds which are adapted for dyeing and printing textile fibers to produce thereon greenish phthalocyanine colors. Additional objects and achievements of this invention will appear as the description proceeds.

Unsubstituted cobalt phthalocyanine precursor is a compound of relatively recent development. According to the best information available to me, it seems to possess a structure comprising 5 phthalonitrile units, a cobalt atom and an extra N-atom per molecule. My novel compounds of this application differ from the aforegoing in having chlorine in the molecule, from 10 to 20 atoms, and therefore producing upon reduction pigments of a greener shade than those obtainable from the unsubstituted compound. In other respects, the molecular constitution of my novel compounds appears to be essentially the same as that of the unsubstituted product. Accordingly, my novel compounds may be expressed generally by the empirical formula

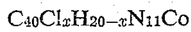

$$C_{40}Cl_xH_{20-x}N_{11}Co$$

wherein $x$ represents an integer from 10 to 20 inclusive. But a better understanding of their constitution may be gained from a study of their mode of synthesis.

According to this invention novel organic compounds of the above character are produced by heating together urea, a cobalt salt, and either chlorinated phthalic anhydride or a mixture of chlorinated and unchlorinated phthalic anhydride. The heating is done at temperatures between 150° and 180° C., in an inert, water-immiscible organic liquid, and in the presence of a catalyst commonly employed in the urea-process for making metal-phthalocyanines, as more fully set forth in U. S. P. 2,197,458 to Wyler and U. S. P. 2,214,477 to Riley. A readily available and satisfactory catalyst of this type is, for instance, ammonium molybdate.

Except for the use of an inert organic liquid diluent and the preferred range of temperatures, the process may in general follow the details of the urea-process as set forth in the aforementioned two patents. Thus, as in the general urea-process aforesaid, wherever I mention phthalic anhydride or a chlorinated derivative thereof, the same may be replaced respectively by other intermediates equally effective in this reaction, for instance o-phthalic acid, its mono- and diammonium salts, its mono- and diamides, phthalimide, phthalimimide (also known as iminophthalimide; see U. S. P. 2,197,458) and their chlorination derivatives.

If a fully chlorinated cobalt phthalocyanine precursor compound is desired, then obviously tetrachloro phthalic anhydride must be selected. If a lesser degree of chlorination is satisfactory, one has the option of choosing a lesser chlorinated phthalic anhydride by itself, say dichloro phthalic anhydride, or of employing a mixture of a tri- or tetrachlorinated phthalic anhydride with unsubstituted phthalic anhydride. The mutual ratio of the two in the mixture may be varied at will. And since it takes 5 molecules of the phthalic compound to form one molecule of cobalt phthalocyanine precursor, it is clear that the reaction product will contain molecules of various degrees of chlorination with a statistical average chlorine content determined by the mutual ratio initially selected. In this fashion, it is possible to produce precursor cobalt phthalocyanine precursor containing any desirable chlorine content, from 10 to 20 atoms per molecule.

In the subsequent conversion into pigment (as more fully set forth hereinbelow), the compound decomposes, splitting off one phthalonitrile unit and a molecule of ammonia. By virtue of the aforementioned statistical distribution, the pigment molecule will generally contain ⅘ of the chlorine content of the precursor compound. Thus, the precursor product obtained from tetrachloro phthalic anhydride will yield hexadecachloro cobalt phthalocyanine, which is distinguished by its exceptionally green shade. On the other extreme, the product prepared from a mixture of 2 molecules of tetrachloro phthalic anhydride and 2 molecules of unsubstituted phthalic anhydride, will yield a pigment analyzing about 8 atoms of Cl per molecule, and of a shade considerably deeper (more blue) than the previously mentioned product.

The chlorinated cobalt phthalocyanine precursors by themselves are not pigments. They are distinguished from the corresponding chlorinated cobalt phthalocyanines in that they are soluble in alcoholic solvents, particularly the lower mono alkyl ethers of ethylene glycol, and that the solution thus prepared has no tinctorial qualities whatsoever. When treated, however, with a reducing agent, for instance ascorbic acid, sodium sulfide, or sodium hydrosulfite, such solutions precipitate the corresponding chlorinated cobalt phthalocyanine. The mentioned solutions may be applied to textile fiber either by dyeing or printing procedures, and when the thus impregnated fiber is then subjected to the action of the mentioned reducing agents (in an aqueous, alcoholic or aqueous-alcoholic medium), the pigment is generated within the fiber, coloring the latter with a pleasing green shade of excellent light fastness and good fastness to washing and crocking.

The organic liquid diluent employed in the synthesis of my novel compounds, should preferably be one which is not miscible with water, so that it may eventually be removed by steam distillation. Examples of suitable liquids are nitrobenzene, o-dichlorobenzene, 1,2,4-trichlorobenzene and kerosene. I find that the chlorinated organic liquids generally give better results where a highly chlorinated end product is sought, whereas nitrobenzene and kerosene are preferred for products of relatively low chlorine content.

The temperature control is likewise preferably varied with chlorine content. While a temperature of 140° to 180° C. is generally workable in all cases, better results are obtained if the temperature is near the higher boundary of this range (say 170° to 180° C.) in the case of the highest Cl-content, and near the lower boundary (i. e. 140°–150° C.) for the reaction masses of lower Cl-content.

The synthesis of my novel compounds, generally produces as by product the corresponding chlorinated cobalt phthalocyanine pigment. The recovery therefore has to be arranged so as to separate this pigment from the desired precursor compound. Three modes of recovery are in general available for this purpose.

According to one mode of procedure, the reaction mass is steam-distilled to remove the organic diluent. There remains an aqueous phase, which contains both pigment and leuco compound in suspension, and is filtered. The filter-cake is then treated with a water-miscible organic solvent, for instance dimethylformamide, which dissolves the precursor compound. Upon filtering, to remove the undissolved pigment, the filtrate is diluted with water to precipitate the precursor, which may then be filtered off.

According to another mode of procedure, the reaction mass is filtered hot, which separates the solid pigment from the organic liquid phase containing the precursor in solution. The filtrate is then steam distilled to remove the solvent, leaving behind an aqueous suspension of the precursor. Filtration and drying are then in order.

A third mode of procedure which may be followed involves a hot filtration of the reaction mass as above, followed by diluting the filtrate with an organic solvent such as cyclohexane, in which the precursor compound is not soluble. The precipitated precursor is then filtered off, washed and dried.

Without limiting my invention, the following examples are given to illustrate my preferred mode of operation. Parts mentioned are by weight.

*Example 1.—Decachloro cobalt phthalocyanine precursor*

Twelve parts of 4,5-dichlorophthalic acid were placed in 125 parts of nitrobenzene. The mixture was agitated and heated slowly until the temperature reached 205° C. The temperature was then allowed to fall to 80° C., and 2.4 parts of cobalt chloride hexahydrate, 45 parts of urea, and 0.25 part of ammonium molybdate were added. This mixture was heated to 150° C. and held at that temperature for five hours. The reaction mass was filtered at 150° C. to remove insoluble material, and the filtrate was cooled and mixed with 1500 parts of high boiling petroleum ether. A yellow-brown solid was separated by filtration, washed with petroleum ether and dried.

The product was a brown solid with no tinctorial value. It exhibited low solubility in the lower alcohols, chloroform and benzene, but was soluble in dimethylformamide and in the lower monoalkyl ethers of ethylene glycol and of diethylene glycol. Analysis of this product indicated a ratio of 10 chlorine atoms per atom of cobalt.

Upon reduction with one part of ascorbic acid in 100 parts of boiling ethyleneglycol-monoethyl-ether, one part of the decachloro cobalt phthalocyanine precursor above obtained gave 0.60 part of octachloro cobalt phthalocyanine. When applied to cotton and reduced on the fiber, a green dyeing is obtained.

*Example 2.—Decachloro cobalt phthalocyanine precursor—method of mixtures*

Forty parts of urea and 7.8 parts of cobaltous chloride hexahydrate were placed in 180 parts of nitrobenzene and the agitated mixture was heated to 80° C. over 1 hour. A blend of 14.8 parts of phthalic anhydride, 28.6 parts of tetrachlorophthalic anhydride and 0.1 part of ammonium molybdate was added, and the temperature was raised slowly, over a period of 2 hours, to 140° C., then further to 150° C. and held at that level for eight hours. The reaction mixture was filtered at 150° C. and the filtrate was cooled and mixed with 5 volumes of cyclohexane. The grey solid which precipitated was filtered off, and agitated at room temperature in 1000 parts of dimethylformamide. After filtration, the dimethylformamide solution was drowned in 10 volumes of water. The precipitated product was filtered off, washed with water, and dried. Its physical properties were essentially the same as in Example 1.

Reduction of 1 part of the above product with 1 part of ascorbic acid in 100 parts of boiling diethylene glycol monobutyl ether gave 0.65 part of a cobalt phthalocyanine containing 31% chlorine, which corresponds to about 8 Cl-atoms per molecule.

If desired, the phthalic and tetrachlorophthalic anhydrides in this example, may be mixed in other proportions to produce leuco compounds having different amounts of chlorine.

*Example 3.—Eicosachloro cobalt phthalocyanine precursor*

A mixture of 72 parts of tetrachlorophthalic anhydride, 100 parts of urea, 10 parts of cobaltous chloride hexahydrate, and 0.1 part of ammonium molybdate was added to 900 parts of 1,2,4-trichlorobenzene. The mass was agitated and heated to 140° C. over 2 hours, then to 180° C. over an additional hour, and held at that level for eight hours. Following filtration at 150° C. the filtrate was cooled and mixed with 3 volumes of cyclohexane. The red-brown precipitate was filtered off, washed successively with benzene, 28% ammonia, 2 N hydrochloric acid and water, and then dried.

The product had essentially no tinctorial value. It formed brown solutions in dimethylformamide and in hot diethyleneglycol monobutyl ether. It was insoluble in benzene, chloroform and the common alcohols. Analysis indicated a content of twenty chlorine atoms per atom of cobalt.

Reduction of 1 part of the product of the above reaction with 1 part of ascorbic acid in 100 parts of boiling diethylene glycol monobutyl ether gave 0.60 part of hexadecachloro cobalt phthalocyanine, which is a green pigment.

For application to textile fabric, one part of the eicosachloro cobalt phthalocyanine precursor was dissolved in 50 parts of dimethylformamide, and the solution was padded onto cotton fabric. The impregnated fabric was reduced at room temperature by immersing it in a solution of 1 part of sodium hydrosulfite in 100 parts of water for 5 minutes. It was then rinsed and soaped at the boil in a 0.5% soap solution. A bright green dyeing was obtained, which exhibited excellent fastness to washing and to light.

I claim as my invention:

1. A process for producing an intermediate complex compound adapted to yield a polychloro cobalt phthalocyanine upon being treated with reducing agents, which comprises reacting an agent of the group consisting of chlorinated phthalic anhydride and mixtures of chlorinated and unchlorinated phthalic anhydride, the chlorine content of the agent being on the average not less than 2 atoms of chlorine per molecule, with urea, and a salt of cobalt in an inert organic liquid in the presence of a molybdate catalyst at a temperature in the range of 140° to 180° C., the quantities of the reagents mentioned being in the proportions of not less than 5 moles of the phthalic reagent and not less than 20 moles of urea per mole of cobalt salt, and recovering from that portion of the reaction mass which is soluble in organic solvents a complex compound, devoid of tinctorial properties and corresponding in constitution to the empirical formula $C_{40}Cl_xH_{20-x}N_{11}Co$, wherein $x$ represents an integer not less than 10 and not greater than 20.

2. A process for producing an intermediate complex compound adapted to yield a polychloro cobalt phthalocyanine upon being treated with reducing agents, which comprises heating a mixture of tetrachlorophthalic anhydride, cobaltous chloride hexahydrate, urea, trichlorobenzene and ammonium molybdate, the proportion by weight of the first three compounds named being essentially 72:10:100, to a temperature of 140° C. over a period of 2 hours, then raising the temperature of the mixture to 180° C., and maintaining the mixture at the higher temperature over a period of 8 to 9 hours, filtering the reaction mass at a temperature of 150° C. and recovering from the filtrate a product soluble in dimethylformamide, substantially insoluble in benzene, having essentially no tinctorial value by itself but yielding upon reduction with ascorbic acid a green pigment.

3. The dimethylformamide-soluble reaction product of the process defined in claim 2.

4. A polychloro cobalt phthalocyanine precursor corresponding to the empirical formula $C_{40}Cl_xH_{20-x}N_{11}Co$, wherein $x$ represents an integer not less than 10 and not greater than 20, and being the product of a process as defined in claim 1, said compound being characterized by being devoid of tinctorial qualities, by being soluble in ethylene glycol monoethyl ether, and by yielding upon reduction with sodium hydrosulfite a polychloro cobalt phthalocyanine pigment having a greener shade than unchlorinated cobalt phthalocyanine.

5. Decachloro cobalt phthalocyanine precursor, the same being a compound of the constitution $$C_{40}Cl_{10}H_{10}N_{11}Co$$

and being the product of a process as defined in claim 1, said compound being characterized by being devoid of tinctorial qualities, by being soluble in ethylene glycol monoethyl ether, and by yielding upon reduction with sodium hydrosulfite a polychloro cobalt phthalocyanine pigment having a greener shade than unchlorinated cobalt phthalocyanine.

6. Eicosachloro cobalt phthalocyanine precursor, the same being the product obtained by reacting not less than 5 moles of tetrachlorophthalic anhydride with about one mole of a salt of cobalt and not less than 20 moles of urea in an inert organic liquid and in the presence of a molybdate catalyst at a temperature in the range of 140° to 180° C., and recovering from that portion of the reaction mass which is soluble in organic solvents a cobalt complex of the constitution $C_{40}Cl_{20}N_{11}Co$, said complex being devoid of tinctorial qualities, being soluble in ethylene glycol monoethyl ether, and yielding upon reduction with sodium hydrosulfite hexadecachloro cobalt phthalocyanine, which is a green pigment.

References Cited in the file of this patent

UNITED STATES PATENTS

| | | |
|---|---|---|
| 2,683,643 | Baumann et al. | July 13, 1954 |

FOREIGN PATENTS

| | | |
|---|---|---|
| 585,727 | Great Britain | Feb. 21, 1947 |